(12) United States Patent
Jenisch et al.

(10) Patent No.: US 9,909,668 B2
(45) Date of Patent: Mar. 6, 2018

(54) MECHANICAL SEAL HAVING A SIMPLIFIED CONSTRUCTION

(71) Applicant: EagleBurgmann Germany GmbH & Co. KG, Wolfratshausen (DE)

(72) Inventors: Bernhard Jenisch, Oberhausen (DE); Joseph Fichtner, Wolfratshausen (DE); Peter Droscher, Geretsried (DE); Josef Gerg, Gaissach (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 14/920,241

(22) PCT Filed: Mar. 17, 2014

(86) PCT No.: PCT/EP2014/055251
§ 371 (c)(1),
(2) Date: Oct. 22, 2015

(87) PCT Pub. No.: WO2014/173585
PCT Pub. Date: Oct. 30, 2014

(65) Prior Publication Data
US 2016/0084384 A1    Mar. 24, 2016

(30) Foreign Application Priority Data

Apr. 24, 2013  (DE) ................. 10 2013 007 165

(51) Int. Cl.
*F16J 15/34* (2006.01)

(52) U.S. Cl.
CPC ....... *F16J 15/3464* (2013.01); *F16J 15/3404* (2013.01); *F16J 15/3484* (2013.01)

(58) Field of Classification Search
CPC .... F16J 15/342; F16J 15/3404; F16J 15/3464; F16J 15/3484; F16J 15/34
See application file for complete search history.

(56) References Cited

U.S. PATENT DOCUMENTS 3,889,960 A * 6/1975 Wiese .................. F04D 29/128
                                                          277/397
3,894,741 A * 7/1975 McHugh .................. F16J 15/40
                                                          277/318

(Continued)

FOREIGN PATENT DOCUMENTS

DE        2228296 A1    12/1973
DE        3143384 A1     5/1983

(Continued)

OTHER PUBLICATIONS

International Search Report dated May 26, 2014 in connection with PCT Application No. PCT/EP2014/055251.

(Continued)

*Primary Examiner* — Eugene G Byrd
(74) *Attorney, Agent, or Firm* — Locke Lord LLP; Scott D. Wofsy; Alicia J. Carroll

(57) ABSTRACT

The invention relates to a mechanical seal arrangement comprising a rotating slide ring (2) and a stationary slide ring (3) which define a sealing gap (4) between them, a holding ring (5) for holding the stationary slide ring (3), and a housing (6), a clamp connection (7) being provided between the housing (6) and the holding ring (5) by way of at least one clamp component (8).

11 Claims, 2 Drawing Sheets

(56) References Cited

U.S. PATENT DOCUMENTS

Figure 1:
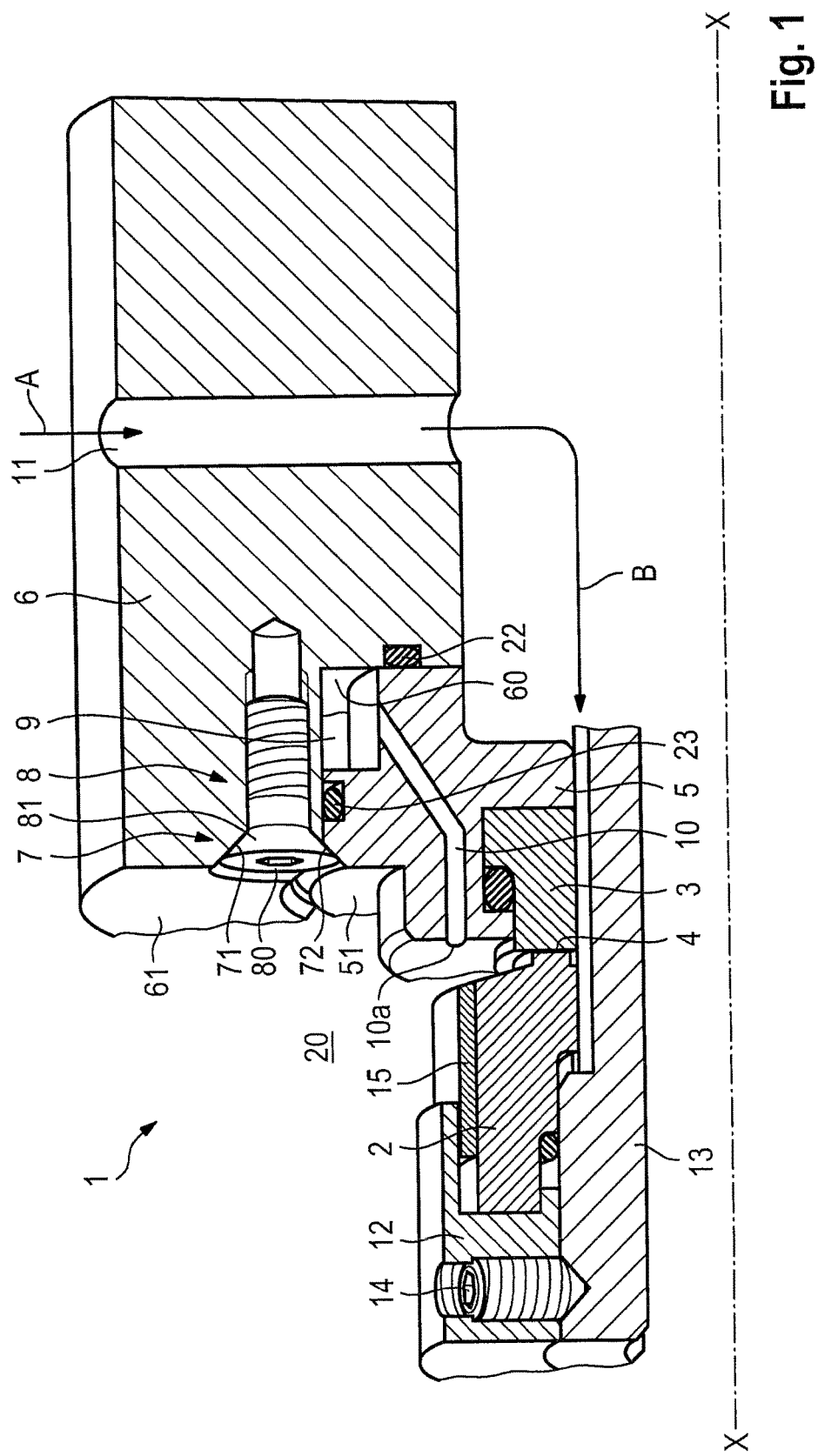

| | | | | |
|---|---|---|---|---|
| 4,804,194 A | * | 2/1989 | Hufford | F16J 15/3404 |
| | | | | 277/408 |
| 4,884,945 A | * | 12/1989 | Boutin | F04D 29/126 |
| | | | | 277/388 |
| 5,066,026 A | * | 11/1991 | Heck | F16J 15/3484 |
| | | | | 277/400 |
| 5,713,576 A | | 2/1998 | Wasser et al. | |
| 2007/0284830 A1 | | 12/2007 | Steigerwald et al. | |
| 2014/0070497 A1 | | 3/2014 | Werdecker et al. | |
| 2014/0175747 A1 | | 6/2014 | Portenlanger et al. | |

FOREIGN PATENT DOCUMENTS

| | | |
|---|---|---|
| DE | 202006011223 U1 | 9/2006 |
| DE | 202010001789 U1 | 5/2010 |
| DE | 202010012401 U1 | 11/2010 |
| DE | 102010054586 A1 | 6/2012 |
| DE | 102011008927 A1 | 7/2012 |
| DE | 102011111697 A1 | 2/2013 |
| DE | 102011083859 A1 | 4/2013 |
| JP | 2002540361 A | 11/2002 |
| WO | WO-2000057090 A1 | 9/2000 |

OTHER PUBLICATIONS

Search Report in connection with Application No. DE 10 2013 007 165.8.

\* cited by examiner

MECHANICAL SEAL HAVING A SIMPLIFIED CONSTRUCTION

The present invention relates to a mechanical seal arrangement having a simplified construction, in particular a clamp connection being provided.

Mechanical seal arrangements are known in various forms from the prior art. Depending on the application, one or more holes or lines for various media have to be provided in the housing of the mechanical seal arrangement. For example, lines for supplying sealing medium, removing sealing medium, removing leakage etc. have to be provided. Thus far, the houses of the mechanical seal arrangement have been formed in multiple parts, the individual parts of the housing being interconnected using screws. However, on the one hand, this results in the problem that mutually adjacent parts of the housing are connected using smaller screws or the multi-part housing is connected using larger screws. On the other hand, the multi-part housing of the mechanical seal arrangement still has to be fixed to a stationary component of a machine or the like. The large number of connections between the individual housing parts results in the problem that for different applications or for different clients different housings are often required, in which the required connection holes for the screw used for fastening have to be provided individually. However, as a result, the required supply lines in the housing cannot be provided in a unitary manner, but instead always have to be adapted individually to the respective housing features. This leads to an undesired large number of special constructions along with corresponding drawbacks in relation to the costs of mechanical seal arrangements of this type.

The object of the present invention is therefore to provide a mechanical seal arrangement which, while being of simple construction and being easy and inexpensive to produce, makes it possible to arrange supply lines in a housing of the mechanical seal arrangement in a simple manner.

This object is achieved by a mechanical seal arrangement having the features of claim 1. The dependent claims disclose preferred developments of the invention.

The mechanical seal arrangement according to the invention having the features of claim 1 comprises a rotating and a stationary slide ring which define a sealing gap between them. A holding ring is provided to hold the stationary slide ring. The slide mechanical seal arrangement further comprises a housing, a clamp connection being provided between the housing and the holding ring by way of at least one clamp component. As a result, a housing can be arranged on the holding ring of the stationary slide ring by means of a clamp connection, in such a way that the fixing of the housing of the mechanical seal arrangement can be of a very simple form. Further, this results in the advantage that holes for lines can be provided in the housing without difficulty, without this resulting in limitations as regards the positioning of the holes for the lines.

So as to have the highest possible variability in the provision of the holes for lines, the clamp connection is preferably provided on an end face of the housing.

It is further preferred for the housing to be single-piece. In this case, the housing is particularly preferably substantially cylindrical.

It is further preferred for the clamp component of the clamp connection to be a countersunk bolt, the countersunk bolt having, on a head, a cone which is set up for a clamp connection with a first conical region on the housing and a second conical region on the holding ring. As a result, the clamp connection can only take place via the head of the countersunk bolt. Particularly preferably, in this case the holding ring has a radially outwardly protruding projection, the second conical region being arranged on the projection. As a result, a particularly compact construction can be achieved, and, in particular as a result of the outwardly protruding projection being provided, the housing can be mounted on the holding ring in a rapid and simple manner.

Particularly preferably, the housing engages around the holding ring at least in part. As a result, the housing forms the outermost regions of the mechanical seal arrangement, in such a way that the holding ring is protected by the housing to some extent. Alternatively, the holding ring could also engage around the housing.

It is further preferred for the housing to comprise a contact face against which the holding ring lies. The contact face is preferably an annular face orientated in the radial direction of the mechanical seal arrangement. Particularly preferably, in this case a circumferential fluid duct is formed between the housing and the holding ring. This arrangement has the advantage that one of the required lines may already be provided by the geometric configuration between the housing and the holding ring, in such a way that one hole fewer is required in the housing.

Particularly preferably, a connection duct, preferably a plurality of connection ducts, are provided in the holding ring, and lead from the fluid duct to an outer face on the sealing gap. As a result, fluid can be guided out of the fluid duct to an outer face of the sealing gap of the mechanical seal arrangement in a simple manner.

It is further preferred for at least one medium line for supplying or removing a medium of the mechanical seal arrangement to be provided in the housing.

According to the invention, the mechanical seal arrangement may be formed as a single mechanical seal arrangement or else alternatively as a double mechanical seal arrangement having two separate mechanical seals. Particularly preferably, the mechanical seal arrangement is used for sealing on pumps.

Figure 2:
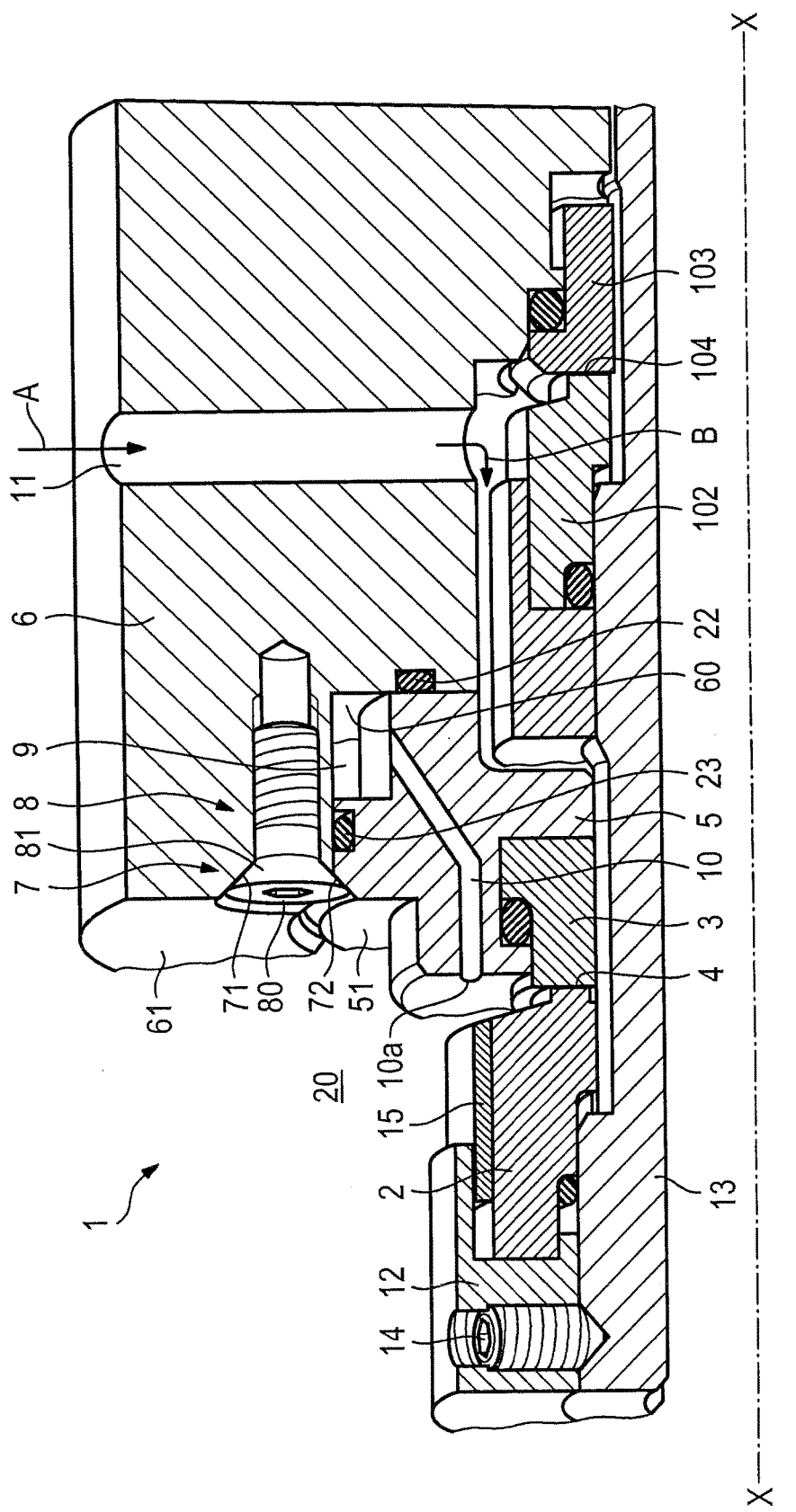

Preferred exemplified embodiments of the invention are described in detail hereinunder with reference to the accompanying drawings. In the drawings, like or functionally equivalent parts are denoted by like reference numerals. In the drawings:

FIG. 1 is a schematic, partially cross-sectional, perspective view of a mechanical seal arrangement according to a first exemplified embodiment, and FIG. 2 is a schematic, partially cross-sectional, perspective view of a mechanical seal arrangement according to a second exemplified embodiment.

As can be seen from FIG. 1, the mechanical seal arrangement 1 according to the invention comprises a rotating slide ring 2 and a stationary slide ring 3 which define a sealing gap 4 between them in a known manner. The rotating slide ring 2 has a bandage 15 on the outer circumference thereof, a rotation of a shaft (not shown) being transmitted from the shaft to a shaft sleeve 13 and from the shaft sleeve 13 to a holder 12, which is connected to the shaft sleeve 13 by connecting screws 14. The holder 12 engages on the outer face of the bandage 15 and transmits a torque to the rotating slide ring 2.

The stationary slide ring 3 is connected to a single-piece housing 6 via a holding ring 5. As can be seen from FIG. 1, the holding ring 5 engages around the stationary slide ring 3 in the axial direction X-X of the mechanical seal arrangement.

A clamp connection 7 is formed between the holding ring 5 and the housing 6. In this exemplified embodiment, the clamp connection 7 is formed by a clamp component 8, which in this exemplified embodiment is a countersunk bolt. A plurality of clamp components 8 are provided on a diameter on the housing 6. For clamping, the clamp component 8 comprises a head 80 and a cone 81 arranged on the underside of the head. Further, the housing 6 comprises a first conical region 71 and the holding ring 5 comprises a second conical region 72. The cone 81 of the clamp component 8 is in contact with the first and second conical regions 71, 72 and, by way of a clamping force applied thereto, connects the housing 6 to the holding ring 5.

As can be seen from FIG. 1, the clamp connection 7 is arranged on an end face 61 of the housing 6. This makes the clamp connection easily accessible, in such a way that the clamp connection can rapidly and easily be established and released again.

As can further be seen from FIG. 1, the holding ring 5 comprises a projection 51 on which the second conical region 72 is formed. As a result, the clamp connection 7 is offset radially outwards, further improving the ease of access.

As can be seen from FIG. 1, the housing 6 is formed in a single piece, and aside from the axial holes for receiving the clamp components 8 no further holes for interconnecting housing parts or the like have to be provided. As a result, lines, such as a medium line 11, can be positioned as desired in the housing 6. The medium line 11 of this exemplified embodiment serves to supply a sealing medium to the inside of the mechanical seal, as is indicated by the arrows A and B. The mechanical seal arrangement 1 thus seals off a product region 20 from the environment.

Further, the housing 6 comprises a contact face 60 against which the holding ring 5 lies. As a result of the projection 51 provided on the holding ring 5, a circumferential fluid duct 9 can be formed between the holding ring 5 and the housing 6. In this exemplified embodiment, the fluid duct 9 has a rectangular cross-section and is provided annularly on the outer surface of the holding ring 5. First and second O-rings 22, 23 serve to seal off the fluid duct 9. Further, at least one connection duct 10 is formed in the holding ring 5, and connects the fluid duct 9 to the product region 20. An opening 10a of the connection duct 10 is close to the sealing gap 4 of the mechanical seal arrangement. As a result, it is made possible in particular to rinse the mechanical seal arrangement at the radially outer region of the two slide rings 2, 3.

Thus, according to the invention, a mechanical seal arrangement can be provided which comprises a single-piece housing 6, in which lines and ducts and the like can be arranged in any desired manner. As a result of the clamp connection 7 being provided between the housing 6 and the holding ring 5, secure connection of the housing 6 to the mechanical seal arrangement is made possible. Since the clamp connection 7 is arranged on the end face 61 of the housing 6, there are virtually no limitations as regards the positioning of lines, such as the medium lines 11, in the housing 6.

FIG. 2 shows a mechanical seal arrangement 1 according to a second exemplified embodiment of the invention. Unlike in the first exemplified embodiment, the mechanical seal arrangement 1 of the second exemplified embodiment further comprises a second mechanical seal arrangement comprising a rotating slide ring 102 and a stationary slide ring 103 which define a sealing gap 104 between them The mechanical seal 1 of the second exemplified embodiment is thus formed as a double seal, the single-piece housing 6 covering the second mechanical seal completely in the axial direction X-X.

LIST OF REFERENCE NUMERALS 1 mechanical seal arrangement
2 rotating slide ring
3 stationary slide ring
4 sealing gap
5 holding ring
6 housing
7 clamp connection
8 clamp component
9 fluid duct
10 connection duct
11 medium duct
12 holder
13 shaft sleeve
14 connecting screws
15 bandage
20 product region
22, 23 O-rings
51 projection
60 contact face
61 end face
71 first conical region
72 second conical region
80 head
81 cone
A, B arrows
X-X axial direction

The invention claimed is:

1. A mechanical seal arrangement comprising:
a rotating slide ring and a stationary slide ring which define a sealing gap between them;
a holding ring for holding the stationary slide ring; and
a housing;
wherein a clamp connection is provided between the housing and the holding ring by way of at least one clamp component; and
wherein the clamp component is a countersunk bolt, which has, on a head, a cone, the cone being set up for a clamp connection with a first conical region on the housing and a second conical region on the holding ring.

2. The mechanical seal arrangement as claimed in claim 1, wherein the clamp connection is arranged on an end face of the housing.

3. The mechanical seal arrangement as claimed in claim 1, wherein the housing is a single-piece.

4. The mechanical seal arrangement as claimed in claim 1, wherein the holding ring comprises a radially outwardly protruding projection, the second conical region being formed on the projection.

5. The mechanical seal arrangement as claimed in claim 1, wherein the housing engages around the holding ring in part.

6. The mechanical seal arrangement as claimed in claim 1, wherein the housing comprises a contact face against which the holding ring lies.

7. The mechanical seal arrangement as claimed in claim 6, wherein a fluid duct is formed between the housing and the holding ring.

8. The mechanical seal arrangement as claimed in claim 7, wherein the holding ring comprises at least one connection duct, which leads from the fluid duct to a product region on an outer face of the sealing gap.

9. The mechanical seal arrangement as claimed in claim 1, wherein the housing comprises at least one medium line for supplying a medium.

10. A mechanical seal arrangement comprising:
a rotating slide ring and a stationary slide ring which define a sealing gap between them;
a holding ring for holding the stationary slide ring; and
a housing;
wherein a clamp connection is provided between the housing and the holding ring by way of at least one clamp component, wherein the clamp component is a countersunk bolt, which has, on a head, a cone, the cone being set up for a clamp connection with a first conical region on the housing and a second conical region on the holding ring,
wherein the housing comprises a contact face against which the holding ring lies, and wherein a fluid duct is formed between the housing and the holding ring and wherein the holding ring comprises at least one connection duct, which leads from the fluid duct to a product region on an outer face of the sealing gap.

11. A mechanical seal arrangement comprising:
a rotating slide ring and a stationary slide ring which define a sealing gap between them;
a housing having a first conical region; and
a holding ring for holding the stationary slide ring, wherein the holding ring includes a second conical region;
wherein a clamp connection is provided between the housing and the holding ring by way of at least one clamp component; and
wherein the clamp component is a countersunk bolt, which has, on a head, a cone, the cone being set up for a clamp connection with the first conical region on the housing and the second conical region on the holding ring.

* * * * *